L. B. HEALY.
LIQUID-MEASURES.

No. 193,761.  Patented July 31, 1877.

Witnesses  
Geo. H. Strong.  
Jno. L. Boone.

Inventor  
Lucien B. Healy  
By Dewey & Co.  
His Attys.

UNITED STATES PATENT OFFICE.

LUCIEN B. HEALY, OF SAN FRANCISCO, CALIFORNIA.

IMPROVEMENT IN LIQUID-MEASURES.

Specification forming part of Letters Patent No. 193,761, dated July 31, 1877; application filed April 24, 1877.

*To all whom it may concern:*

Be it known that I, LUCIEN B. HEALY, of the city and county of San Francisco, and State of California, have invented a Metric Cup; and I do hereby declare the following to be a full, clear, and exact description thereof, reference being had to the accompanying drawings.

My invention relates to a simple and convenient device for illustrating the decimal system of weights and measures; and it consists of a measuring cup having a holding capacity equal to one kilogram of water, (liquid measure,) while its exterior measurement coincides with a cube whose edge is one-tenth of a meter, (lineal measure,) representing the capacity of a liter, (solid measure,) and in which the area of one of its sides is a square decimeter, equal to one-millionth part of a hectare, (superficial measure.)

Figure 1:
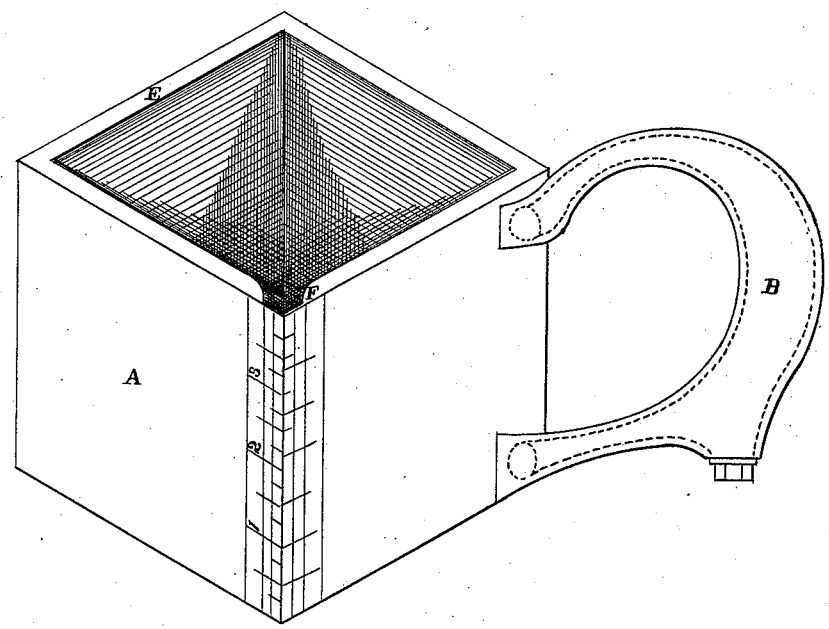
Figure 2:
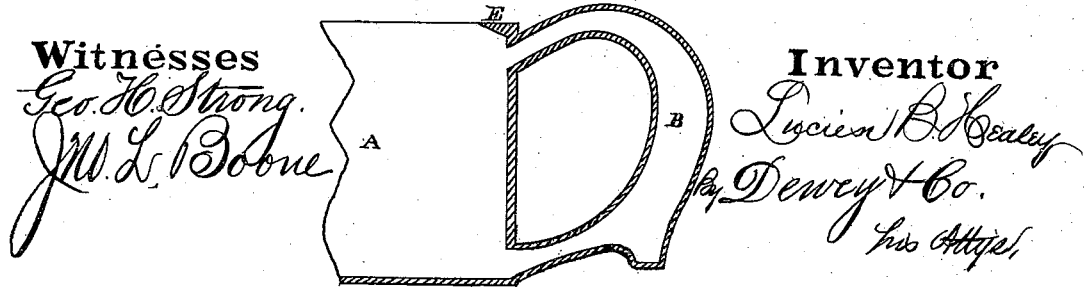

Referring to the accompanying drawings, Figure 1 is a perspective view of my cup. Fig. 2 is a section of the handle.

Let A represent a square cup having equal sides, and which is provided with a handle, B. The area of each side or face of this cup is equal to a square decimeter—that is, each of its four edges is one-tenth of a meter in length, so that the cube represented by the square is equal to one liter, or one one-thousandth of a stere. Now, according to the metric system of weights and measures, one kilogram of water weighs one liter, so that a cubic quantity of water equal to the cube represented by the exterior of the cup represents one kilogram. This cup, therefore, will contain one kilogram of water, minus the quantity displaced by the thickness of the sides of the cup. To remedy this difficulty I make the handle B tubular, so that it will contain a quantity of water equal to the quantity displaced by the thickness of the sides of the cup, thus providing a measuring-cup that will contain one kilogram of water at the same time that each of its exterior faces represent a square decimeter, while the cubic measurements of the cup represent a liter.

My invention, therefore, consists in providing a measuring-cup the cube of which represents a liter, and in adapting said cup to hold a kilogram of water, by increasing its containing capacity by the employment of a supplemental reservoir or receptacle which will contain an amount of water equal to that displaced by the thickness of the sides. This supplemental reservoir or receptacle is most conveniently formed in the handle of the cup; but it can be formed in any protuberance or projection which forms a part of the cup.

In the manufacture of my measuring-cup, I construct it with a horizontal flange, E, projecting inward from the upper edges of its open sides, so that it can be uniformly filled to a proper height by using the edges of this surrounding flange as a guide, and in place of a projecting spout I remove a portion of the flange at one corner, as at F, through which the liquid can be poured; but the flange may be dispensed with, if desired. The sides of the cup can be marked, if desired, to represent their measurement, and a scale can be marked on one or more edges, giving the graduations in inches and tenths of a meter; but these features can be dispensed with, as they only serve as instructions to the user to indicate the actual size and the measurement of the parts.

Having thus described my invention, what I claim, and desire to secure by Letters Patent, is—

A metric cup having equal sides, the cube of which represents a liter, and provided with a tubular handle or other supplemental receptacle which is capable of containing a quantity of water equal to that displaced by the thickness of the sides, so as to render the cup capable of containing a kilogram of water, substantially as and for the purpose described.

In witness whereof I have hereunto set my hand and seal.

LUCIEN B. HEALY. [L. S.]

Witnesses:
JNO. L. BOONE,
OLWYN T. STACY.